June 15, 1954  C. J. MITCHELL  2,680,874
TRANSPARENT DIAL GUARD WIPER
Filed Nov. 2, 1951

INVENTOR.
CARL J. MITCHELL
BY
Arnold and Mathis
ATTORNEYS

Patented June 15, 1954

2,680,874

UNITED STATES PATENT OFFICE 2,680,874

TRANSPARENT DIAL GUARD WIPER

Carl J. Mitchell, Seattle, Wash.

Application November 2, 1951, Serial No. 254,578

4 Claims. (Cl. 15—255)

This invention relates to a cleaning device for transparent meter-dial guards.

More particularly, my invention relates to a device providing a wiper for the inside surface of a transparent guard disposed over the dial of a water meter in order to remove frost, moisture or any vision obstructing deposit which may be present on the inside surface of such a guard. While this invention relates primarily to the foregoing, it may be used in association with other devices having transparent guards for dials or the like.

Especially during the winter seasons, water meter transparent guards become coated with a fog-like mist or deposit and this obstructs vision of the indicia on the dial of the meter. So troublesome has this condition become at times, that meter readers often break the glass guard so they can read the meter with the consequent loss of a guard for the meter parts.

Due to the many millions of water meters now in operation, it is impractical to provide a device which cannot be used on existing meters.

The present invention is designed to obviate the before-mentioned problems and to facilitate the reading of water meters.

A further object of this invention is to produce a guard cleaner which may be easily applied to existing meters and economically and rapidly installed on the same.

It is a further object of my invention to provide a guard cleaner which may be economically produced as well as economically installed.

It is a further object of my invention to provide a device which may be economically replaced in case of wear or damage.

Other objects and advantages of my invention will become apparent as the description of the same proceeds, and the invention will be best understood from a consideration of the following detailed description taken in connection with the accompanying drawings forming a part of the specification, with the understanding, however, that the invention is not to be limited to the exact details of construction shown and described since obvious modifications will occur to those skilled in the art.

In the following drawings like reference numerals will indicate like parts.

Figure 2:
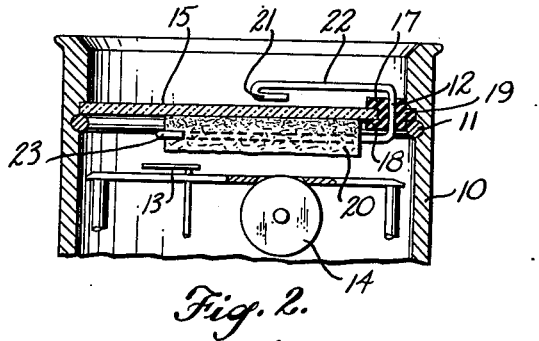
Fig. 2 is a fragmentary view in section with parts in elevation of the construction shown in Fig. 1.

In the drawings, 10 designates the meter casing; 11, the retainer ring for the transparent guard 15; 13, the dial to indicate tenths of a cubic foot, and 14 the cubic feet indicators which parts are of conventional type and need not be described in detail. It is to be understood that these parts may be of any ordinary construction. It is the purpose of this invention to clean the inside surface of different types of meter or dial guards, which dial guards are generally made of glass and at times they are made of a transparent plastic. Also the dial guards are round or rectangular.

Figure 4:
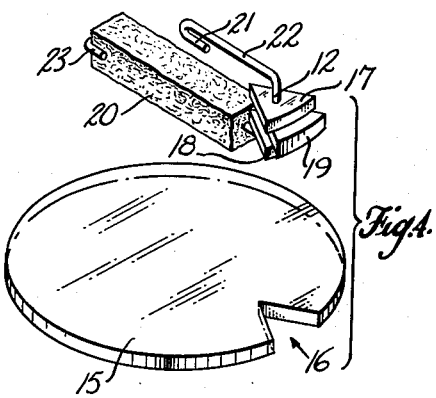
Fig. 4 is an exploded perspective view showing a device of my invention in connection with a dial guard.
Figure 1:
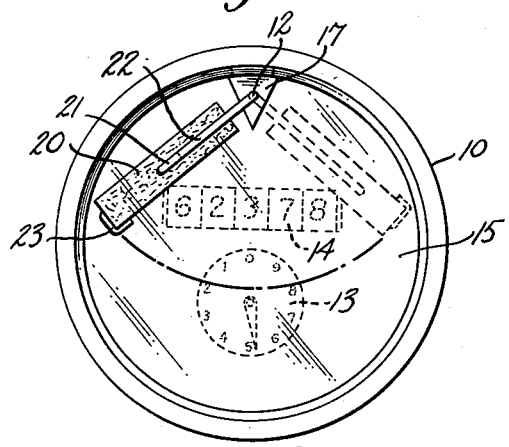
Figure 1 is a view in plan of a typical water meter dial equipped with a device embodying my invention.

Referring now to Fig. 4 of the drawings the meter dial guard 15 is provided with a recess 16 which is shown in Figs. 1 to 4 inclusive as being of triangular shape. A wiper arm fulcrum is composed of an upper portion 17, a lower portion 18, and a mid-portion 19. The mid-portion 19 interfits snugly with the recess 16, and the upper and lower portions 17 and 18 overlie and seal against the upper and lower marginal portions, forming the recess 16. Also, the mid-portion 19 at the outside completes the periphery of the guard 15. The outside portion of the upper and lower portions 17 and 18 do not extend outwardly the same as the mid-portion 19 so as to permit the retaining ring 11 to be properly positioned which is best shown in Figs. 2 and 4.

The means to mount and permit turning of the wiper blade 20 preferably comprises a continuous piece of wire having a U-shaped portion 21, which permits the wire assembly to function as a spring urging the wiper blade 20 against the inside surface of the guard 15; a lever portion 22 which may be grasped to angularly move the wiper blade 20; a portion 12 disposed at right angles to the portion 22, which functions as a fulcrum; and wiper engaging portion 23. The wiper engaging portion 23 is preferably parallel to the lever portion 22 and extends through the wiper blade 20 and is secured thereto as by crimping the outer end of the wiper engaging portion 23 against portions of blade 20 therebetween. The blade 20 may be formed of felt, rubber, or other usual material employed in wiper blades.

Figure 3:
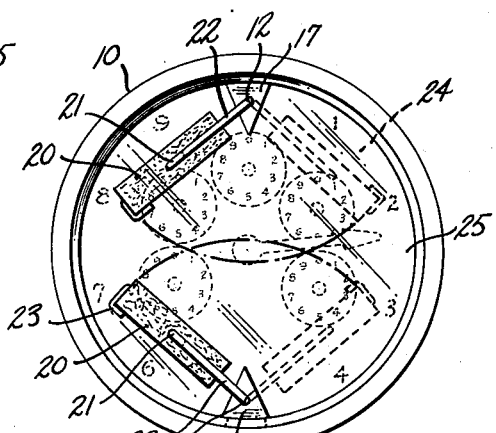
Fig. 3 is a view in plan similar to Fig. 1 of devices of my invention adapted to a different type water meter dial.

In Fig. 3 of the drawings I have shown two devices of my invention employed in connection with a meter dial wherein a single wiper blade will not produce the desirable vision. As the wipers may be identical to those mentioned in connection with Figs. 1, 2, and 4, similar parts are given similar numbers. As the dial face is different, the same is numbered 24. Also as the transparent guard has two wedge shaped or triangular openings, the same is numbered 25.

Figure 5:
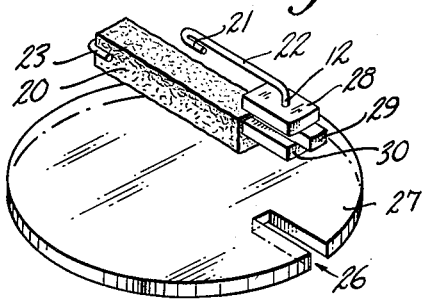
Fig. 5 is a view similar to Fig. 4 of a modified form of my invention.

Referring now to Fig. 5 of the drawings, a modification of my invention is shown. Here a rectangular recess 26 is employed in the transparent guard 27. The wiper and wire assembly may be the same as shown in the previous figures and hence said parts are given the same numbers as they were given in the previous figures. The wiper arm fulcrum is made to interfit with the rectangular recess 26 and hence, the parts thereof are given different numbers. The said wiper arm fulcrum comprises an upper portion 28, a mid-portion 29, and a lower portion 30. The mid-portion 29 has a width sufficient to snugly interfit and fill the recess 26. It has a length which is sufficient to complete the periphery of the transparent guard 27. The upper portion 28 and the lower portion 30 each overlie and seal against the adjacent top and bottom marginal portions respectively of the transparent guard 27 forming the recess 26 and they are of a length shorter than the mid-portion 29 so that the retaining ring 11 will cause a complete seal similar to that described in connection with Figs. 1 to 4 inclusive.

Figure 6:
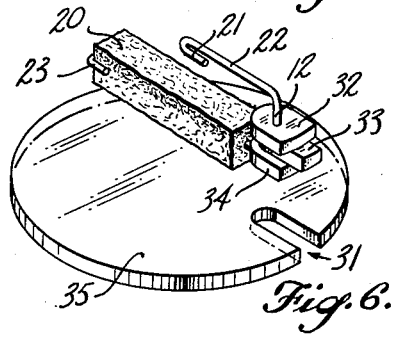
Fig. 6 is a view similar to Fig. 4 of a still further modified form of my invention.

Referring now to Fig. 6 of the drawing a still further modified form of my invention is shown. Here, a recess 31 has a form wherein the side walls thereof are substantially parallel and the end wall is substantially semi-circular. Again, the wiper and wire assembly may be the same as those shown in the previous figures and hence the parts are given the same numbers as in previous figures. The wiper arm fulcrum is made to interfit the recess 31 and said wiper arm fulcrum comprises an upper portion 32, a mid-portion 33, and a lower portion 34. The mid-portion 33 has a width sufficient to snugly interfit with the side walls forming the recess 31 and said mid-portion 33 terminates in a rounded inner end portion so that the opening 33 is snugly filled. Also, said mid-portion 33 has a length so that one end thereof completes the periphery of the transparent guard 35. The upper portion 32 and the lower portion 34 each overlie and seal against the marginal top and bottom portions respectively of the transparent guard 35 forming the recess 31 and again they are of a shorter length than the mid portion 33 so that the retaining ring 11 will cause a complete seal similar to that described in connection with the previous figures.

Figure 7:
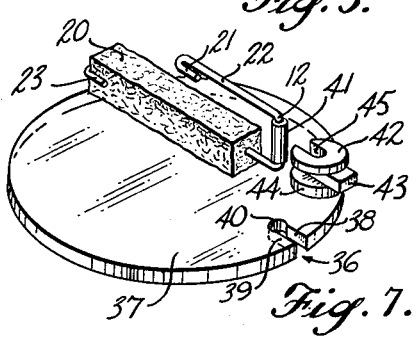
Fig. 7 is a view similar to Fig. 4 of a still further modified form of my invention.

Referring now to Fig. 7 of the drawings, a still further modified form of my invention is shown. A recess 36 is provided in the transparent guard 37 and the recess 36 has two substantially parallel side walls 38 and 39. The circular wall 40 may be more than one-half a circle providing that sleeve 41 is made of a compressible material as rubber. Thus, the sleeve 41 may be urged between the side walls 38 and 39 and will snugly fill the opening provided in part by the circular end wall 40. As the wiper and wire assembly may be the same as those shown in the previous figures, the said parts are given the same number as they were given in the previous figures.

Preferably, the ferrule 41 is of rubber and is employed so that we will not have metal against glass or against a transparent plastic material. Also, the sleeve 41 preferably sealed on the inside against wire portion 12 and on the outside against the recess formed adjacent the end wall 40.

The wiper arm fulcrum is made to interfit with the recess 36 and comprises an upper portion 42, a mid-portion 43, and a lower portion 44. At their inner end portions, each of the portions 41, 42, and 43 is provided with an arcuate recess 45 of a size to be urged about the sleeve 41, thus forming a seal thereagainst. The mid-portion 43 is of a size to snugly fill the recess 36 except that portion which is filled by the sleeve 41 and is of a length so as to complete the periphery of the transparent guard 37. The upper portion 42 and the lower portion 44 each overlie and seal against the top and bottom marginal portions respectively of the transparent guard 37 forming the recess 36 and they again are of a shorter length than the mid-portion 43 so that the retaining ring 11 will cause the seal similar to that described in connection with the previous figures. The circular contour of the external periphery of the portions 42 and 44 is for appearance.

In the foregoing various modifications of my invention I have in each instance illustrated a transparent guard of circular shape, however, it will be readily apparent that the circular shape is of no great moment and my devices can easily be used in connection with rectangular or other shaped transparent guards.

Also, in each instance the upper and lower portions, as 17 and 18, forming a fulcrum for the wiper are of a shape to complete the periphery of the guard against the casing 10. Thus, a double seal against the casing 10 is formed—one by a mid-portion as 19, and one by the upper and lower portions, as 17 and 18. The upper and lower portions, as 17 and 18, overlie the marginal portions of a guard, as 15, forming a recess, as 16, to form a seal and to prevent displacement of the wiper mechanism.

From the foregoing it is obvious that I have provided a transparent guard having a recess at an edge portion thereof. Also, I have provided a substantially U-shaped wiper arm having the side legs thereof disposed respectively above and below the transparent guard and with the middle leg thereof passing through said recess. I have provided a wiper blade carried by the side leg which is disposed below the said transparent guard. Also, I have provided a fulcrum forming device which is disposed on the middle leg of said substantially U-shaped member and said fulcrum forming device comprises or includes therein a mid-portion which interfits with said recess in said transparent guard. Preferably, the said fulcrum forming device comprises top and bottom portions which overlie and seal against the marginal portions of the transparent guide which form said recess. The said recesses in the edge portion of the transparent guard may be of various forms such as a wedge-shaped recess, a rectangular shaped recess, and a recess having substantially parallel sidewalls which terminate in a substantially semi-circular end wall. Also, I may employ a sleeve about the mid-portion of the U-shaped member. Also, preferably the leg of the U-shaped member which is disposed above the transparent guard is bent against itself and engages the guard, so that spring tension is provided urging the wiper blade against the under side of the transparent guard.

Obviously, changes may be made in the forms, dimensions, and arrangements of the parts of my invention without departing from the principle thereof, the above setting forth only preferred forms of embodiment of my invention.

I claim:

1. A combination transparent guard and wiper therefore for use in a water meter having a retaining ring disposed below the guard for holding the guard in place comprising a transparent guard having a recess at an edge portion thereof and which recess extends to said edge; a substantially U-shaped wiper arm having the side legs thereof disposed respectively above and below the transparent guard and the middle leg thereof passing through said recess; a wiper blade carried by one of said side legs of said U-shaped arm and disposed below the said transparent guard; and a fulcrum forming and sealing device having an opening therethrough receiving said middle leg of said U-shaped wiper arm, said fulcrum forming device being formed of rubber and comprising a mid-portion of a size to snugly interfit with the said recess in said guard and to extend outwardly to the said edge of said guard, and two outer portions of a size to overlie the side edges of the recess in said guard and to terminate short of the side edge of said guard to seal the edges of said opening and to permit the retaining ring to extend around the edges of the guard and to contact the guard at the location of the fulcrum forming device.

2. The combination of claim 1 wherein said recess in said guard is wedge shaped.

3. The combination of claim 1 wherein said recess is of rectangular shape.

4. The combination of claim 1 wherein the said walls forming the recess are substantially parallel and terminate in a substantially semi-circular end wall.

References Cited in the file of this patent

UNITED STATES PATENTS

| Number | Name | Date |
|---|---|---|
| 737,439 | Michie | Aug. 25, 1903 |
| 1,248,795 | Beitman | Dec. 4, 1917 |